United States Patent
An

(10) Patent No.: US 6,179,649 B1
(45) Date of Patent: Jan. 30, 2001

(54) SIM CARD INCORPORATED IN BATTERY PACK OF TERMINAL

(75) Inventor: Seong-Hyuk An, Kumi (KR)

(73) Assignee: Samsung Electronics Co., Ltd. (KR)

( * ) Notice: Under 35 U.S.C. 154(b), the term of this patent shall be extended for 0 days.

(21) Appl. No.: 09/340,811

(22) Filed: Jun. 28, 1999

(30) Foreign Application Priority Data

Jun. 27, 1998 (KR) ................................................ 98-24602

(51) Int. Cl.⁷ .................................................... H01R 3/00
(52) U.S. Cl. .......................................... 439/500; 379/433
(58) Field of Search ..................................... 439/500, 329, 439/331; 455/89, 90; 379/433, 434, 428; 235/479, 441

(56) References Cited

U.S. PATENT DOCUMENTS 5,320,552    6/1994   Reichardt et al. ................... 439/331

FOREIGN PATENT DOCUMENTS

WO 97 08907    3/1997   (WO) .

OTHER PUBLICATIONS

European Search Report, EP 99 10 76 70, Nov. 25, 1999.

*Primary Examiner*—Neil Abrams
*Assistant Examiner*—Eugene G. Byrd
(74) *Attorney, Agent, or Firm*—Dilworth & Barrese, LLP

(57) ABSTRACT

A SIM (Subscriber Identity Module) card stores all the subscriber-related information data for a terminal. This invention relates to a locating a SIM card (postage stamp type, module type or IC type) in a battery of the terminal as opposed to in a body of the terminal, in order to use space within the terminal more efficiently. In the terminal, a terminal body has a main PCB (Printed Circuit Board), an interface connector connected to the main PCB, and at least a pair of first SIM card connecting terminals and a charging terminal which are integrally formed with the interface connector and exposed from a body base. A battery pack is detachably mounted on the base of the terminal body, a SIM card reader is built in the battery pack, a SIM card contact device is fixed to the SIM card reader and has a cover and a plurality of terminals connected to the SIM card reader, for holding a SIM card, the postage stamp type SIM card is slidably inserted under the cover of the SIM card contact device, and at least a pair of second SIM card connecting terminals are electrically connected to the SIM card reader and exposed at the positions corresponding to the first SIM card connecting terminals on a base of the battery pack, for electrically connecting the SIM card in the battery pack to the main PCB of the terminal body.

8 Claims, 3 Drawing Sheets

SIM CARD INCORPORATED IN BATTERY PACK OF TERMINAL

CLAIM OF PRIORITY

This application makes reference to, incorporates the same herein, and claims all benefits accruing under 35 U.S.C. §119 from an application entitled SIM CARD INCORPORATED IN BATTERY PACK OF TERMINAL earlier filed in the Korean Industrial Property Office on Jun. 27, 1998, and there duly assigned Ser. No. 98-24602.

BACKGROUND OF THE INVENTION

1. Field of the Invention

The present invention relates to a terminal, such as a portable telephone, and more particularly, to a SIM (Subscriber Identity Module) card storing subscriber-related information data, which is located within a battery pack of the terminal, preferably being detachably inserted into the terminal.

2. Description of the Related Art

There are three general digital cellular systems, namely GSM (Global System for Mobile) which is a European TDMA (Time Division Multiple Access) system, NA-TDMA (North American TDMA), and CDMA (Code Division Multiple Access).

GSM is an international standard, offering compatibility throughout diverse telecommunications networks and has been implemented in Europe and countries in other continents.

A terminal in the GSM system includes a SIM card. The SIM card stores most of the information needed for operating a terminal, including data representing a telephone number, a network number, and subscriber information, such as subscriber ID.

SIM cards are available in two types, namely a postage stamp type (see U.S. Pat. No. 5,320,552) and a credit card type. The postage stamp type SIM card is detachably inserted into a SIM card contact device after a battery pack is removed from the body of the terminal. The SIM card contact device is then mounted onto the terminal body.

Conventional SIM cards, regardless of their type, typically occupy a relatively large area, which is contradictory to the current trend toward manufacturing more compact, lightweight terminals.

In the postage stamp type SIM card, a SIM card reader is installed on a main PCB(Printed Circuit Board) of a body and the SIM card is electrically connected to the SIM card reader by means of a SIM card contact device. Consequently, the SIM card reader and contact device occupy a relatively large area on the body of the terminal, limiting the compactness of the terminal body, thereby decreasing product competitiveness.

In the credit card type SIM card, the SIM card is pushed between the terminal body and a battery pack for installation, resulting in decreased contact reliability and also presenting an inconvenience to the user.

SUMMARY OF THE INVENTION

To overcome the aforementioned problems, an object of the present invention is to provide a SIM card (module type or IC type) which is incorporated in a battery pack, resulting in a more compact terminal design.

To achieve the above object, a SIM card is provided in a terminal using a battery. In the terminal, a terminal body has a main PCB (Printed Circuit Board), an interface connector connected to the main PCB, and at least a pair of first SIM card connecting terminals along with charging terminal, both being integrally formed with the interface connector and exposed from a body base. A battery pack is detachably mounted on the base of the terminal body, a SIM card reader is built in the battery pack, a SIM card contact device is fixed to the SIM card reader and has a cover and a plurality of terminals connected to the SIM card reader, for holding a SIM card. The SIM card of the present invention is preferably a postage stamp type SIM card and is slidably inserted under the cover of the SIM card contact device, and at least a pair of second SIM card connecting terminals are electrically connected to the SIM card reader and exposed at the positions corresponding to the first SIM card connecting terminals on a base of the battery pack, for electrically connecting the SIM card in the battery pack to the main PCB of the terminal body.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
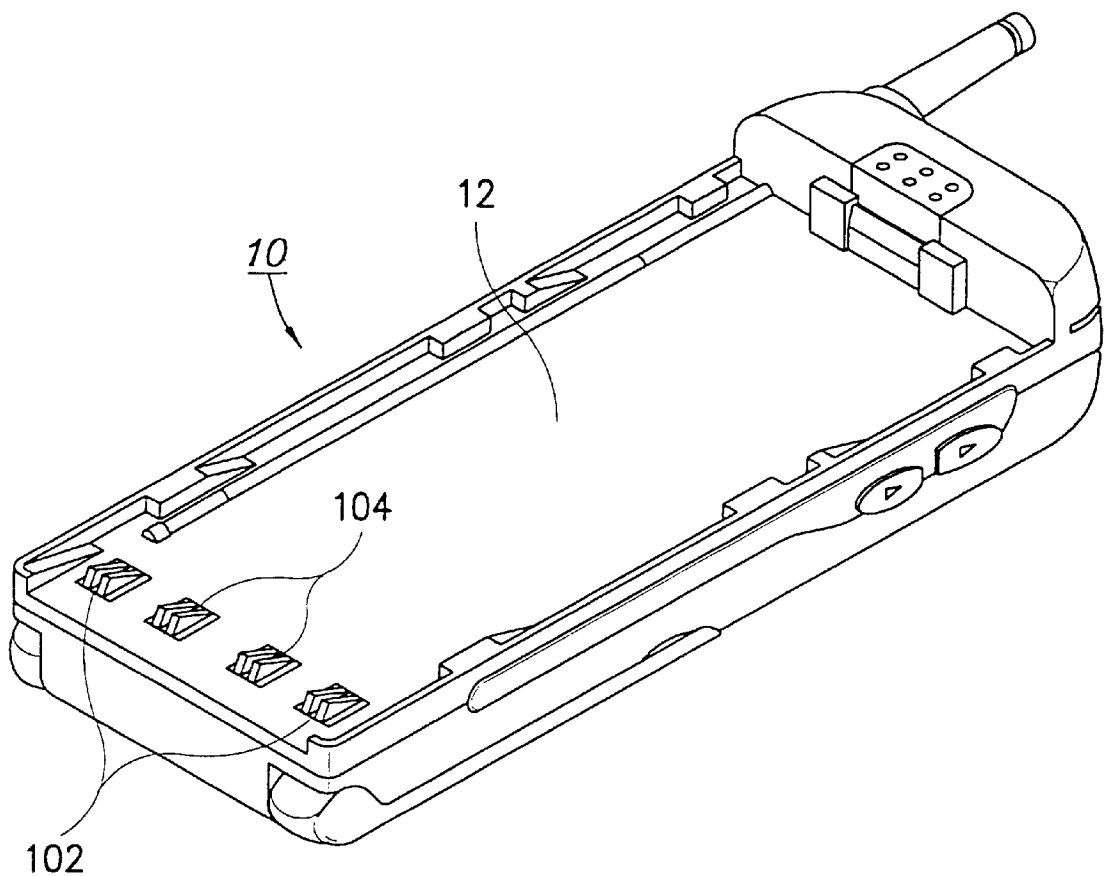
FIG. 1 is a perspective view of a terminal body with a battery pack removed therefrom according to a preferred embodiment of the present invention.

A preferred embodiment of the present invention will be described in detail referring to the attached drawings. Like reference numerals denote the same components in the drawings. It is to be noted that a detailed descriptions of known functions or structures of the present invention have been omitted if it was deemed to obscure the subject matter of the present invention.

Referring to FIG. 1, charging terminals 102 for receiving a power voltage from a battery pack, as is well known in the field, are symmetrically exposed from a base 12 in a terminal body 10 with the battery pack removed therefrom. The charging terminals 102 are connected to an interface connector (not shown) electrically linked to a main PCB of the body 10. The battery pack contains battery cell charging terminals 202, as seen in FIG. 2, connected to battery cells, which are exposed at the positions corresponding to the charging terminals 102, thereby electrically contacting the charging terminals when the battery is installed.

First SIM card connecting terminals 104 are integrally formed with the interface connector of the charging terminals 102, between the charging terminals 102. That is, the first SIM card connecting terminals 104 are electrically coupled to the main PCB of the body 10.

Figure 2:
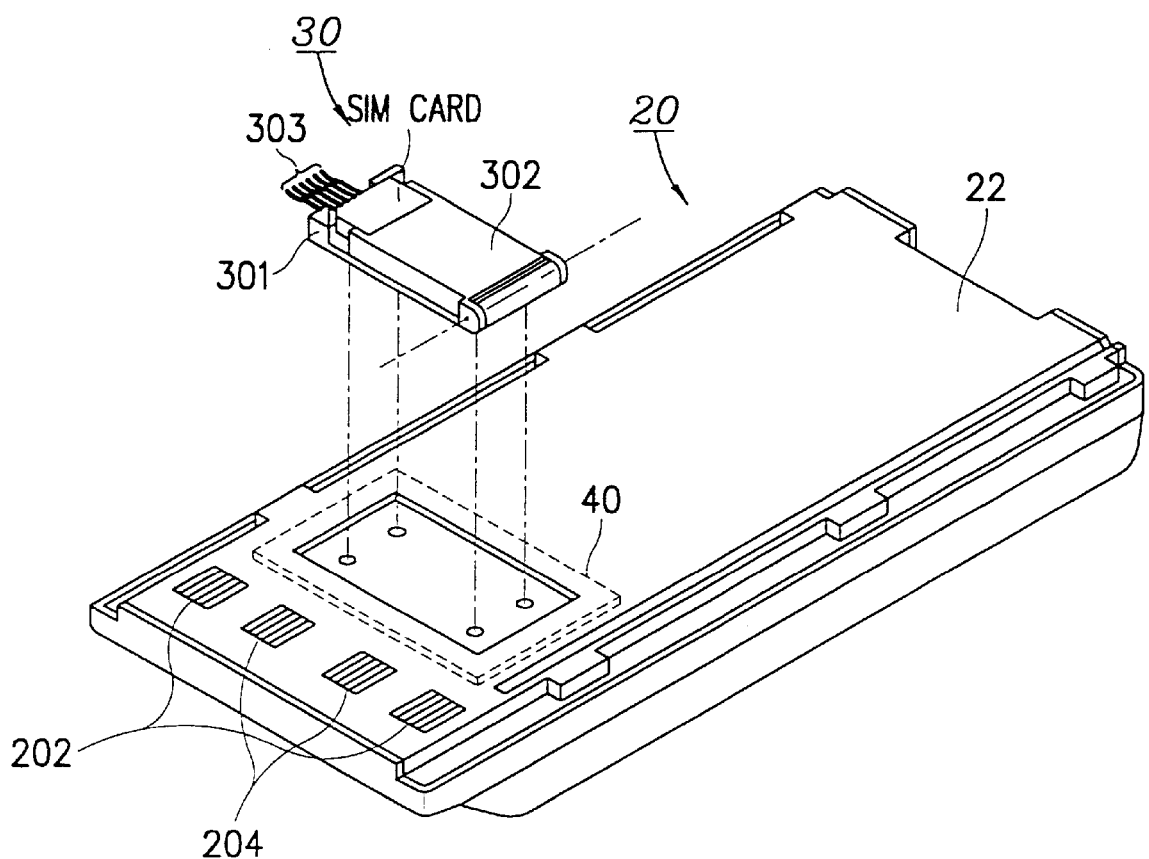
FIG. 2 is an exploded perspective view of the battery pack detached from the terminal body according to the preferred embodiment of the present invention.
Figure 3:
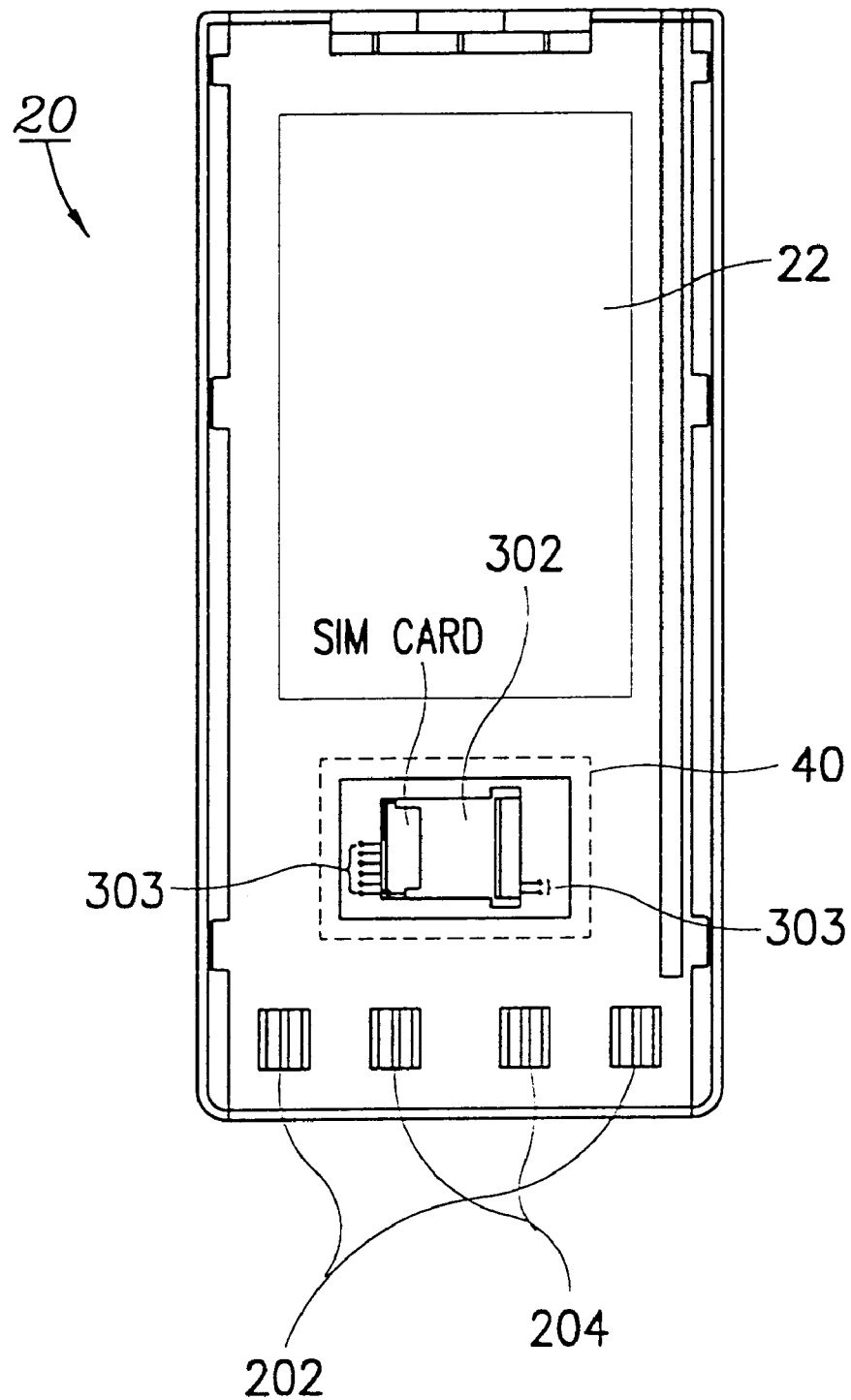
FIG. 3 is a plan view of the battery pack shown in FIG. 2.

As shown in FIGS. 2 and 3, a battery pack 20 of the present invention is detachable from the terminal body 10. The battery pack 20 includes battery cells well known in the field and a SIM card reader 40 in a lower portion of the battery pack 20, for reading data from and writing data to a SIM card. The battery cells function as a power supply for the SIM card reader as well as the terminal.

The SIM card, used for storing subscriber identification data, is comprised of a power receiver well known in the field, a memory for reading and writing data, a ground, and a dummy. A SIM card contact device 30 is connected to the SIM card reader 40 and includes a housing 301, a cover 302, a hinge, and a plurality of terminals 303. The SIM card can be freely detached from the SIM card contact device 30. The SIM card contact device 30 is preferably mechanically fixed on the SIM card reader 40 so as not to protrude upward with respect to the surface of the base 22, by inserting protrusions (not shown) formed at the four corners of the SIM card contact device 30 into holes of the SIM card reader 40. Terminals 303 may be soldered onto the SIM card reader 40, or fixed in other ways such as through a terminal block, to maintain electrical connection.

Exposed second SIM card connecting terminals 204, which correspond to the first SIM card connecting terminals 104 of FIG. 1, are fixedly attached to the battery pack base 22. The second SIM card connecting terminals 204 are electrically connected to the SIM card reader 40.

Reference numeral 202 denotes battery cell charging terminals. The second SIM card connecting terminals 204 may be disposed independently from the charging terminals 202 and can be soldered to the SIM card reader 40.

The SIM card is inserted under the SIM card cover 302, the cover 302 rotates upon the hinge which is held in the housing 301, and then the cover 302 slidably moves until locked into the housing 301. Thus, the SIM card is fixedly held in the housing 301.

To remove the SIM card from the housing 301, the above procedure is performed in a reverse order. That is, the cover 302 rotates upward from the housing 301, the SIM card is removed, and then the cover 302 is locked into the housing 301.

The battery pack 20 of the present invention includes the battery cells, a protection circuit, the SIM card, the SIM card contact device, and the SIM card reader 40.

If the protection circuit is present to protect the battery cells of the battery pack 20 against excess heat, it is preferable to integrate the protection circuit with the SIM card reader 40 and fix the SIM card contact device 30 to the SIM card reader 40.

When the battery pack is mounted on the terminal body, the main PCB of the body is electrically connected to a PCB connected to the SIM card reader of the battery pack. That is, the main PCB of the body is connected to the SIM card reader sequentially via the SIM card connecting terminals of the terminal body base and the SIM card connecting terminals of the battery pack. As a result, the SIM card is electrically connected to the main PCB.

While the SIM card is a postage stamp type detachable from the battery pack in the embodiment of the present invention, it can be integrated with the battery pack. Alternatively, the SIM card and the SIM card reader can be embodied as a module type or an IC type to be incorporated with the battery pack.

In accordance with the present invention as described above, the SIM card, storing data for subscriber identification, is detachably incorporated in the battery pack so that the space required for the SIM card, SIM card contact device, and SIM card reader on the body is decreased, providing a more compact body. The same result may also be obtained by configuring the SIM card and the SIM card reader as a module type or an IC type built in the battery pack. Further, the SIM card of the present invention offers the advantage of user convenience.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A terminal comprising;
   a terminal body having a main PCB (Printed Circuit Board), an interface connector connected to the main PCB, and at least a pair of first SIM (Subscriber Identity Module) card connecting terminals and a charging terminal which are integrally formed with the interface connector and exposed from a base of the terminal body;
   a battery pack detachably mounted on the base of the terminal body;
   a SIM card reader located within the battery pack;
   a SIM card contact device having a plurality of terminals connected to the SIM card reader, said SIM card contact device adapted to hold a SIM card; and
   at least a pair of second SIM card connecting terminals electrically connected to the SIM card reader and fixedly attached on a base of the battery pack, being exposed at the positions corresponding to the first SIM card connecting terminals, for electrically connecting the SIM card in the battery pack to the main PCB of the terminal body.

2. A terminal as recited in claim 1, wherein the SIM card contact device includes a cover for holding the SIM card.

3. A terminal as recited in claim 1, wherein the SIM card contact device is fixedly secured to the SIM card reader.

4. A terminal as recited in claim 2, wherein the SIM card is a postage stamp type SIM card and is slidably inserted under the cover of the SIM card contact device.

5. A terminal as recited in claim 1, wherein the SIM card is a module type SIM card, which, upon insertion into the SIM card reader, is electrically connected to the SIM card contact device.

6. A terminal as recited in claim 1, wherein the SIM card is an IC type SIM card, which, upon insertion into the SIM card reader, is electrically connected to the SIM card contact device.

7. A terminal comprising;
   a terminal body having a main PCB (Printed Circuit Board), an interface connector connected to the main PCB, and at least a pair of first SIM (Subscriber Identity Module) card connecting terminals and a charging terminal which are integrally formed with the interface connector and exposed from a base of the terminal body;
   a battery pack detachably mounted on the base of the terminal body;
   a module type SIM card reader located within the battery pack;
   a SIM card contact device having a plurality of terminals connected to the module type SIM card reader, said SIM card contact device adapted to hold a module type SIM card; and
   at least a pair of second SIM card connecting terminals electrically connected to the module type SIM card reader and fixedly attached on a base of the battery pack, being exposed at the positions corresponding to the first SIM card connecting terminals, for electrically connecting the module type SIM card in the battery pack to the main PCB of the terminal body.

8. A terminal comprising;

a terminal body having a main PCB (Printed Circuit Board), an interface connector connected to the main PCB, and at least a pair of first SIM (Subscriber Identity Module) card connecting terminals and a charging terminal which are integrally formed with the interface connector and exposed from a base of the terminal body;

a battery pack detachably mounted on the base of the terminal body;

a IC type SIM card reader located within the battery pack;

a SIM card contact device having a plurality of terminals connected to the IC type SIM card reader, said SIM card contact device adapted to hold a IC type SIM card; and at least a pair of second SIM card connecting terminals electrically connected to the IC type SIM card reader and fixedly attached on a base of the battery pack, being exposed at the positions corresponding to the first SIM card connecting terminals, for electrically connecting the IC type SIM card in the battery pack to the main PCB of the terminal body.

* * * * *